United States Patent
Guo

(10) Patent No.: US 8,278,903 B1
(45) Date of Patent: Oct. 2, 2012

(54) OPTIMIZATION OF PWM DC OPERATING POINT OF VOLTAGE REGULATORS WITH WIDE OPERATING RANGE

(75) Inventor: Jason Yigang Guo, Cupertino, CA (US)

(73) Assignee: Fairchild Semiconductor Corporation, South Portland, ME (US)

(*) Notice: Subject to any disclaimer, the term of this patent is extended or adjusted under 35 U.S.C. 154(b) by 495 days.

(21) Appl. No.: 12/548,202

(22) Filed: Aug. 26, 2009

(51) Int. Cl.
*G05F 1/00* (2006.01)

(52) U.S. Cl. .................................................. 323/288

(58) Field of Classification Search ........... 323/282–288
See application file for complete search history.

(56) References Cited

U.S. PATENT DOCUMENTS

| | | | |
|---|---|---|---|
| 7,372,241 B1 * | 5/2008 | Tomiyoshi | 323/288 |
| 7,667,443 B2 * | 2/2010 | Gray et al. | 323/282 |

OTHER PUBLICATIONS

FAN5031, 8-Bit Programmable, 2 to 4 Phase, Synchronous Buck Controller, Mar. 2006, pp. 1-3, Fairchild Semiconductor Corporation.

FAN2106—TinyBuck, 6A, 24V Input, Integrated Synchronous Buck Regulator, Oct. 2008, pp. 1-14, Fairchild Semiconductor Corporation.

Unitrode High Power Factor Preregulator—UC1854 UC2854 UC3854, Jun. 1998, pp. 1-8, Unitrode Corporation.

* cited by examiner

*Primary Examiner* — Adolf Berhane
*Assistant Examiner* — Yemane Mehari
(74) *Attorney, Agent, or Firm* — Okamoto & Benedicto LLP

(57) ABSTRACT

A pulse width modulation (PWM) DC operating point of a voltage regulator is configured to be relatively independent of an input voltage and an output voltage of the regulator. A drive transistor of the regulator is periodically switched ON to couple the input voltage to an output capacitor to generate the output voltage. A ramp signal is generated by dividing a signal generated from the input voltage with another signal generated from the output voltage and using the resulting signal to charge a capacitor. The ramp signal is compared to an error voltage indicative of a level of the output voltage to determine when to switch OFF the drive transistor.

20 Claims, 5 Drawing Sheets

OPTIMIZATION OF PWM DC OPERATING POINT OF VOLTAGE REGULATORS WITH WIDE OPERATING RANGE

BACKGROUND OF THE INVENTION

1. Field of the Invention

The present invention relates generally to electrical circuits, and more particularly to voltage regulators.

2. Description of the Background Art

A voltage regulator generates a regulated output voltage from an input voltage. A buck regulator is a voltage regulator that generates an output voltage smaller than the input voltage, while a boost regulator is a voltage regulator that generates an output voltage larger than the input voltage. A buck-boost regulator is a voltage regulator that generates an output voltage smaller, equal, or larger than the input voltage. A voltage regulator may employ pulse width modulation (PWM) to vary the ON time of a drive transistor to generate a regulated output voltage.

The PWM DC (direct current) operating point of a voltage regulator, which affects the over current headroom and noise sensitivity of the regulator, dictates the duty cycle of the drive transistor for a given input voltage and output voltage. While a circuit designer may optimize the PWM DC operating point to a sweet spot, e.g., particular input voltage, output voltage, and duty cycle, such optimization typically involves reconfiguration of the voltage regulator to meet the needs of particular applications. This poses a problem for voltage regulator device manufacturers who may need to offer the same voltage regulator to different customers with varying applications.

SUMMARY

In one embodiment, a pulse width modulation (PWM) DC operating point of a voltage regulator is configured to be relatively independent of an input voltage and an output voltage of the regulator. A drive transistor of the regulator is periodically switched ON to couple the input voltage to an output capacitor to generate the output voltage. A ramp signal is generated by dividing a signal generated from the input voltage with another signal generated from the output voltage and using the resulting signal to charge a capacitor. The ramp signal is compared to an error voltage indicative of a level of the output voltage to determine when to switch OFF the drive transistor.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
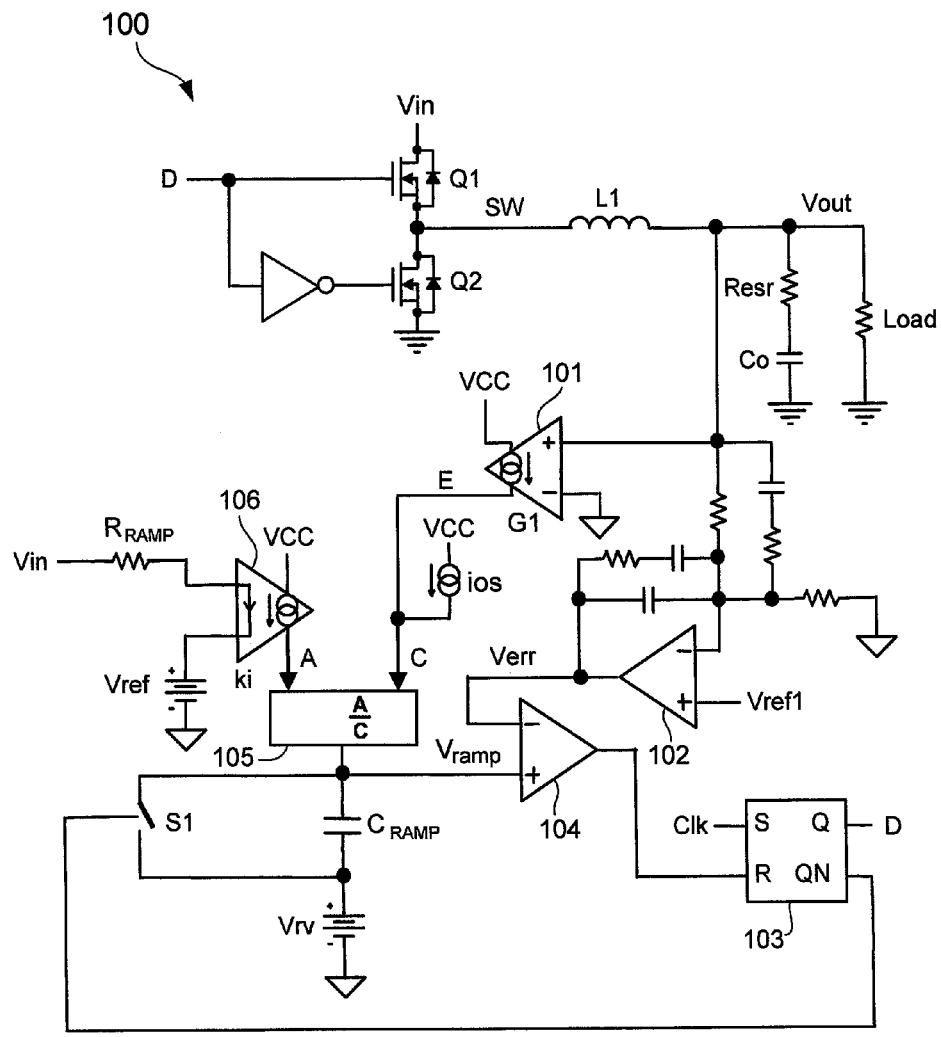
FIG. 1 shows a schematic diagram of a voltage regulator in accordance with an embodiment of the present invention.

FIG. 1 shows a schematic diagram of a voltage regulator 100 in accordance with an embodiment of the present invention. In the example of FIG. 1, the regulator 100 is a buck regulator in that an output voltage Vout is smaller than an input voltage Vin.

A duty cycle signal D output of the S-R flip-flop (FF) 103 drives a pair of drive transistors Q1 and Q2 to generate the regulated output voltage Vout. The transistors Q1 and Q2 are complementarily driven in that the transistor Q1 is switched ON when the transistor Q2 is switched OFF and vice versa. The transistor Q1 is also referred to as the "high side" transistor because it is used to couple the switch node SW to the input voltage Vin. The transistor Q2 is also referred to as the "low side transistor" because it is used to couple the switch node SW to ground.

When the signal D is asserted, which is a logical HIGH in the example of FIG. 1, the transistor Q1 is switched ON and the transistor Q2 is switched OFF to couple the input voltage Vin to an output capacitor Co by way of an output inductor L1. The resistor Resr represents the equivalent series resistance (ESR) of the output capacitor Co. When the signal D is not asserted, which is a logical LOW in the example of FIG. 1, the transistor Q1 is switched OFF and the transistor Q2 is switched ON to decouple the input voltage Vin from the output capacitor Co. The pulse width of the signal D is automatically adjusted by pulse width modulation (PWM) to set the duty cycle of the transistor Q1, and hence the regulator, to regulate the output voltage Vout across the output capacitor Co.

An error amplifier 102 compares a monitored (e.g., scaled) version of the output voltage Vout to a voltage reference Vref1. The resulting error voltage Verr at the output of the error amplifier 102 is thus indicative of the level of the output voltage Vout. In the following embodiments, the error voltage Verr is the PWM DC operating point of the regulator. As will be more apparent below, the following embodiments allow the error voltage Verr, and hence the PWM DC operating point of the regulator, to be independent of the input voltage Vin, output voltage Vout, and, optionally, the frequency of the PWM clock.

A PWM comparator 104 compares the error voltage Verr to a ramp signal Vramp to determine when to switch OFF the transistor Q1 and switch ON the transistor Q2. In the example of FIG. 1, because the ramp signal Vramp is on the plus input of the PWM comparator 104, the PWM comparator 104 resets the S-R FF 103 when the ramp signal Vramp exceeds the error voltage Verr. Resetting the S-R FF 103 results in the signal D at the Q output of the S-R FF 103 to be de-asserted, thereby switching OFF the transistor Q1 (and switching ON the transistor Q2). When the S-R FF 103 is reset, a signal at its QN (i.e., Q NOT) output closes a switch S1 to set the ramp signal Vramp to its valley (i.e., lowest) voltage level set by the offset voltage Vrv.

A PWM clock signal Clk at the S input of the S-R FF 103 periodically sets the S-R FF 103 to assert the signal D, and thereby switch ON the transistor Q1 (and switch OFF the transistor Q2). When the S-R FF 103 is set, the signal at its QN output opens the switch S1 to allow the ramp signal Vramp to ramp up. The regulation cycle repeats when the ramp signal Vramp exceeds the error voltage Verr, which is the PWM DC operating point of the regulator 100.

The regulator 100 has feed forward voltage control configuration in that the input voltage Vin is used to generate the ramp signal Vramp. In the example of FIG. 1, the input voltage Vin is coupled to the ramp resistor $R_{RAMP}$ to generate a current input to a current amplifier (e.g., current mirror) 106 having a gain ki. The input voltage Vin is much bigger than the reference voltage Vref (i.e., Vin>>Vref). The current amplifier 106 outputs a corresponding current signal A, which is input to a divide circuit 105.

A transconductance amplifier 101 receives the output voltage Vout to generate a current signal E, which is proportional to the output voltage Vout by a gain G1. The current signal E is thus representative of the output voltage. To prevent interfering with the stability of the regulator's main control loop, the transconductance amplifier 101 is selected to have a relatively low bandwidth that is much smaller than the closed loop control bandwidth. An offset current ios is added to generate a current signal C. The offset current ios is chosen to be much smaller than the current signal E (i.e., ios<<E), and is employed to ensure that the divide circuit 105 does not divide by zero when the current signal E is zero. Therefore, the current signal C is substantially the same as the current signal E.

The divide circuit 105 comprises an electrical circuit configured to divide the current signal A by the current signal C to output a current signal that charges the ramp capacitor $C_{RAMP}$. The charging of the ramp capacitor $C_{RAMP}$ by the divide circuit 105 generates the ramp signal Vramp. As will be more apparent below, the resulting ramp signal Vramp advantageously allows for an optimized PWM DC operating point that is relatively independent of the output voltage Vout and input voltage Vin, allowing the regulator 100 to operate reliably over relatively wide operating range.

Figure 2:
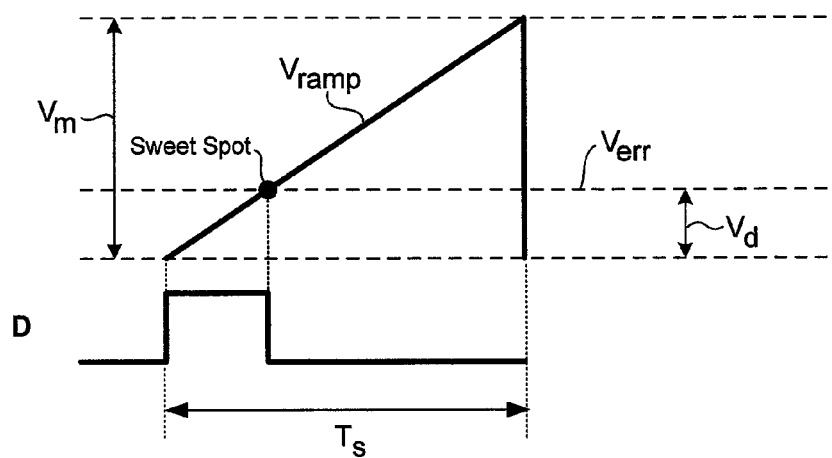
FIG. 2 illustrates the timing relationship between a duty cycle signal and a ramp signal in the regulator of FIG. 1.

FIG. 2 illustrates the timing relationship between the signal D and the ramp signal Vramp in the regulator 100. The sweet spot that dictates when the signal D is de-asserted is at the intersection of the ramp signal Vramp and the error voltage Verr. The voltage Vm is the valley-to-maximum peak voltage of the ramp signal Vramp. To provide headroom, the valley of the ramp signal Vramp is typically a voltage level greater than 0 (e.g., 1V), while the maximum peak of the ramp signal Vramp is typically a voltage level lower than the Vcc or power supply voltage (e.g., 3V with a Vcc of 4V). FIG. 2 shows one clock cycle of the PWM clock signal Clk (see S input of S-R FF 103 in FIG. 1), which has a period Ts.

Still referring to FIG. 2, the ramp signal Vramp starts from its valley and increases towards its maximum peak when the signal D is asserted (a logical HIGH in this example). The signal D remains asserted until the ramp signal Vramp exceeds the error voltage Verr at the sweet spot, at which point the signal D is de-asserted. An operating point voltage Vd is the valley-to-peak voltage of the ramp signal Vramp at the sweet spot (see FIG. 2). The value of the voltage Vd dictates when the signal D is de-asserted, and thus sets the PWM DC operating point of the regulator 100 by controlling the duty cycle of its high side transistor, which is the drive transistor Q1 in this example. The voltage Vd for the regulator 100 of FIG. 1 may be derived as follows.

The current signal A is given by EQ. 1.

$$A = \frac{(V_{IN} - V_{REF})}{R_{RAMP}} k_i \quad \text{(EQ. 1)}$$

where ki is the gain of the current amplifier 106. The output of the divide circuit 105 is the current signal A divided by the current signal C, which represents the output voltage Vout (assuming ios<<E).

$$\frac{A}{C} = \frac{(V_{IN} - V_{REF})}{R_{RAMP}} \times k_i \times \frac{1}{V_{OUT} \times G1} \quad \text{(EQ. 2)}$$

where G1 is the gain of the transconductance amplifier 101. The output of the divide circuit 105 charges the capacitor $C_{RAMP}$ to generate the ramp signal Vramp. The time from the valley to sweet spot of the ramp signal Vramp is equal to the duty cycle of the regulator multiplied by the period Ts of the PWM clock signal Clk. Therefore, the voltage Vd is given by, $$V_d = \frac{(V_{IN} - V_{REF})}{R_{RAMP} \times C_{RAMP}} \times k_i \times \frac{V_{OUT}}{V_{IN}} \times Ts \times \frac{1}{V_{OUT} \times G1} \quad \text{(EQ. 3)}$$

Assuming Vref is much smaller than Vin and simplifying, $$V_d = \frac{k_i T_S}{R_{RAMP} C_{RAMP} \times G1} \quad \text{(EQ. 4)}$$

From EQ. 4, the voltage Vd of the regulator 100 is independent of the input voltage Vin and the output voltage Vout. This advantageously allows the regulator 100 to have an optimized PWM DC operating point over a wide operating range.

Figure 3:
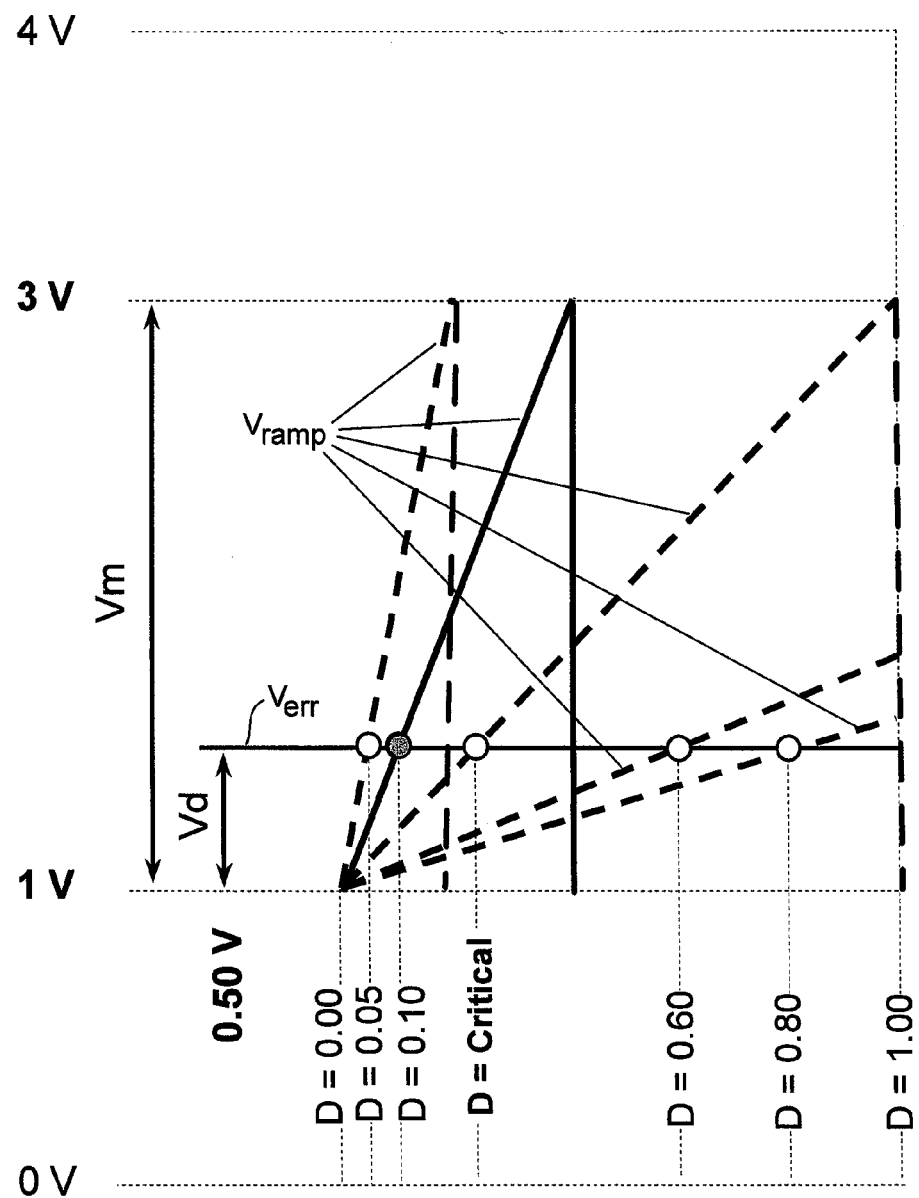
FIG. 3 illustrates an optimized PWM DC operating point technique of the regulator of FIG. 1.

FIG. 3 illustrates the optimized PWM DC operating point technique of the regulator 100. In the example of FIG. 3, the regulator 100 is configured to have a sweet spot for an input voltage Vin of 12V, output voltage Vout of 1.2V, and duty cycle of 0.10 (i.e., D=0.10). The voltage Vrv (see FIG. 1) is set to 1 V, which is the valley voltage of the ramp signal Vramp. In the example of FIG. 3, D represents duty cycle. Because the PWM DC operating point of the regulator 100 is independent of the input voltage Vin and output voltage Vout, the voltage Vd is the same regardless of duty cycle. That is, the error voltage Verr, and hence the PWM DC operating point, is relatively constant with varying duty cycle. This allows for improved sensitivity for small duty cycles and the same over current and transient headroom for duty cycles less than the critical duty cycle (see D=critical), which is given by, $$D_{critical} = \frac{V_d}{V_m} \quad \text{(EQ. 5)}$$

Figure 4:
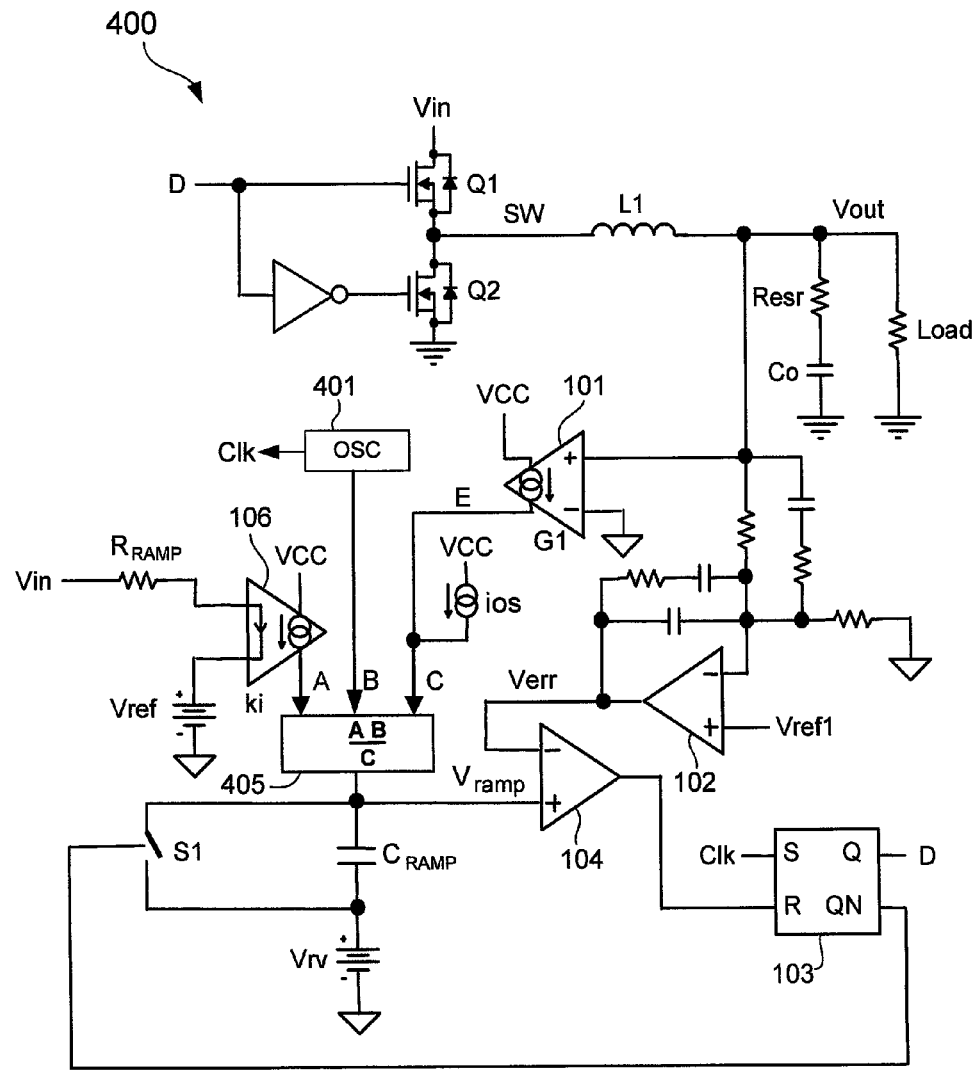
FIG. 4 shows a schematic diagram of a voltage regulator in accordance with another embodiment of the present invention.

Although the PWM DC operating point of the regulator 100 is independent of the input voltage Vin and the output voltage Vout, the PWM DC operating point is still affected by the period Ts, i.e., the frequency of the PWM clock signal Clk. FIG. 4 shows an embodiment that addresses this issue for applications where it is desirable to make the PWM DC operating point independent of the PWM clock signal as well.

FIG. 4 shows a schematic diagram of a voltage regulator 400 in accordance with an embodiment of the present invention. The regulator 400 is the same as the regulator 100 except for including the PWM clock signal Clk as a factor in generating the ramp signal Vramp. In the regulator 400, a divide and multiply circuit 405 replaces the divide circuit 105 of the regulator 100. As its name implies, the circuit 405 comprises an electrical circuit configured to multiply the current signal A with the current signal B to generate a product, and divide the product with the current signal C. The current signal B is a DC current and represents the PWM clock signal Clk generated by the oscillator 401. As in the regulator 100, the PWM clock signal Clk is coupled to the S input of the S-R FF 103 to periodically assert the duty cycle signal D. The other components of the regulator 400 have been explained with reference to the regulator 100.

In the example of FIG. 4, the current signal B is proportional to the frequency of the clock signal Clk.

$$B = kt \times fs \qquad (EQ.\ 6)$$

where Kt is a constant and fs is the clock frequency. At a sweet spot, the current signal B is the same as the current signal C, which is equal to the current signal A multiplied by some constant. That is, at a sweet spot, $$B = C = kd \times A \qquad (EQ.\ 7)$$

where kd is a constant. The other conditions are the same as in the regulator 100. The voltage Vd for the regulator 400 may thus be described by EQ. 4 multiplied by the frequency function of the clock signal Clk shown in EQ. 6. This cancels the period Ts from EQ. 4 giving, $$V_d = \frac{k_i \times kt}{R_{RAMP} C_{RAMP} \times G1} \qquad (EQ.\ 8)$$

From EQ. 8, the PWM DC operating point of the regulator 400 is independent of the input voltage Vin, output voltage Vout, and PWM clock frequency.

Figure 5:
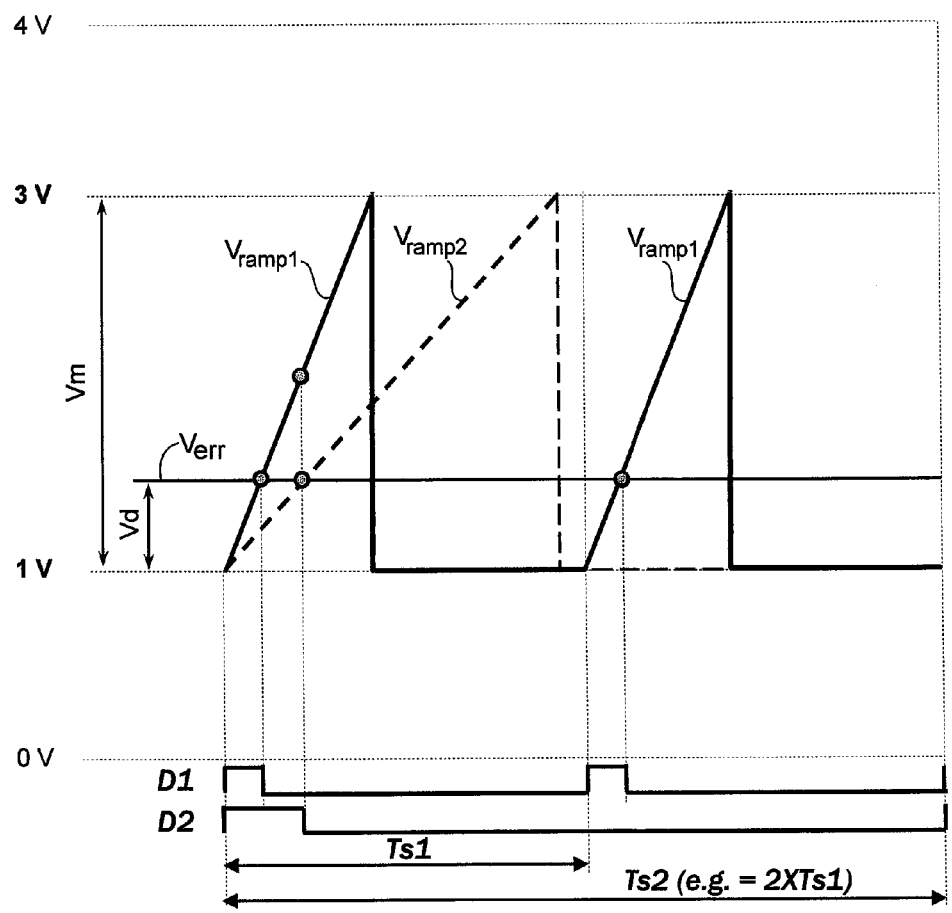
FIG. 5 illustrates an optimized PWM DC operating point technique of the regulator of FIG. 4.

FIG. 5 illustrates the optimized PWM DC operating point technique of the regulator 400. In the example of FIG. 5, the regulator 400 is configured to have PWM DC operating voltage (i.e. Verr voltage) around 1.5V for a sweet spot of an input voltage Vin of 12V, output voltage Vout of 1.2V, and duty cycle of 0.10. The ramp signal Vramp1 corresponds to the duty cycle signal D1, and the ramp signal Vramp2 corresponds to the duty cycle signal D2. In the example of FIG. 5, the signal D1 is for a first PWM clock frequency having a period Ts1, and the signal D2 is for a second PWM clock frequency having a period Ts2. The period Ts2 is set to be twice as long as the period Ts1 in this example. Advantageously, changing from the first to the second PWM clock frequency changes the slope of the ramp signal (see Vramp1 to Vramp2), but does not affect the error voltage Verr because the voltage Vd is independent of the PWM clock frequency. This allows the regulator 400 to be suitably employed in applications with differing input voltages, output voltages, and PWM clock frequencies.

Improved techniques for setting the PWM DC operating point of voltage regulators have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of setting a pulse width modulation (PWM) DC operating point of a voltage regulator that generates a regulated output voltage from an input voltage, the method comprising:

generating a first current signal from the input voltage;
generating a second current signal that is proportional to the output voltage;
dividing the first current signal by the second current signal to generate a third current signal;
charging a capacitor with the third current signal to generate a ramp signal;
generating an error voltage indicative of a level of the output voltage; and
comparing the ramp signal to the error voltage to determine when to switch OFF a drive transistor of the voltage regulator and control a duty cycle of the drive transistor by PWM to regulate the output voltage, the drive transistor being configured to couple the input voltage to a load when switched ON.

2. The method of claim 1 wherein the generating the second current signal comprises:
converting a monitored output voltage to current to generate a fourth current signal; and
adding a current offset to the fourth current signal to generate the second current signal.

3. The method of claim 2 wherein the fourth current signal is generated by a transconductance amplifier.

4. The method of claim 1 further comprising:
adding an offset voltage to the ramp signal to set a valley of the ramp signal.

5. The method of claim 1 wherein generating the first current signal comprises:
generating a fifth current signal representative of the input voltage; and
providing the fifth current signal as an input to a current amplifier that generates the first current signal.

6. The method of claim 1 further comprising:
generating a sixth current signal that is proportional to a frequency of a PWM clock of the voltage regulator, the PWM clock being configured to periodically switch ON the drive transistor; and
removing an effect of the frequency of the PWM clock from the PWM DC operating point by multiplying the first current signal with the sixth current signal to generate a product and dividing the product with the second current signal to generate the third current signal.

7. A voltage regulator comprising:
a drive transistor configured to couple an input voltage of the voltage regulator to a load when switched ON and to decouple the input voltage from the load when switched OFF;
an error amplifier configured to generate an error voltage representative of a level of an output voltage of the voltage regulator;
a first circuit configured to generate a first current signal using the input voltage;
a second circuit configured to generate a second current signal that is proportional to the output voltage;
a third circuit configured to generate a third current signal by dividing the first current signal with the second current signal;
a ramp capacitor configured to be charged by the third current signal to generate a ramp signal; and
a comparator configured to compare the ramp signal against the error voltage to set a duty cycle of the drive transistor by pulse width modulation (PWM).

8. The voltage regulator of claim 7 wherein the first circuit comprises a current amplifier having the input voltage as an input.

9. The voltage regulator of claim 7 wherein the second circuit comprises:

a transconductance amplifier configured to generate a current signal that is added to an offset current to generate the second current signal.

10. The voltage regulator of claim 7 further comprising an oscillator configured to generate a PWM clock signal for periodically switching ON the drive transistor.

11. The voltage regulator of claim 7 wherein the third circuit is configured to generate the third current signal by generating a product by multiplying the first current signal with a current signal proportional to the PWM clock signal and dividing the product by the second current signal.

12. The voltage regulator of claim 7 further comprising an offset voltage configured to set a valley of the ramp signal.

13. The voltage regulator of claim 7 further comprising another drive transistor that is complementary driven with the drive transistor.

14. A method to be performed by a voltage regulator, the method comprising:
   periodically switching ON a drive transistor to couple an input voltage of the voltage regulator to an output capacitor to deliver a regulated output voltage to a load;
   generating an error signal representative of the output voltage;
   generating a ramp signal from a first signal generated from the input voltage and a second signal generated from the output voltage; and
   comparing the error signal to the ramp signal to control a duty cycle of the drive transistor by pulse width modulation.

15. The method of claim 14 wherein generating the ramp signal comprises:
   dividing the first signal generated from the input voltage with the second signal generated from the output voltage to generate a third signal; and
   charging an output capacitor with the third signal to generate the ramp signal.

16. The method of claim 15 wherein the first signal is generated by a current amplifier having the input voltage as an input.

17. The method of claim 16 wherein the second signal is generated by a transconductance amplifier having the output voltage as an input.

18. The method of claim 14 wherein generating the ramp signal comprises:
   multiplying the first signal generated from the input voltage with a fourth signal proportional to a clock signal used to periodically switch ON the drive transistor to generate a product;
   dividing the product with the second signal generated from the output voltage; and
   charging a ramp capacitor with the third signal to generate the ramp signal.

19. The method of claim 18 further comprising:
   adding an offset to the second signal to prevent division by zero when dividing the product with the second signal.

20. The method of claim 14 wherein generating the error signal comprises:
   comparing the output voltage to a reference voltage.

* * * * *